Patented July 26, 1938

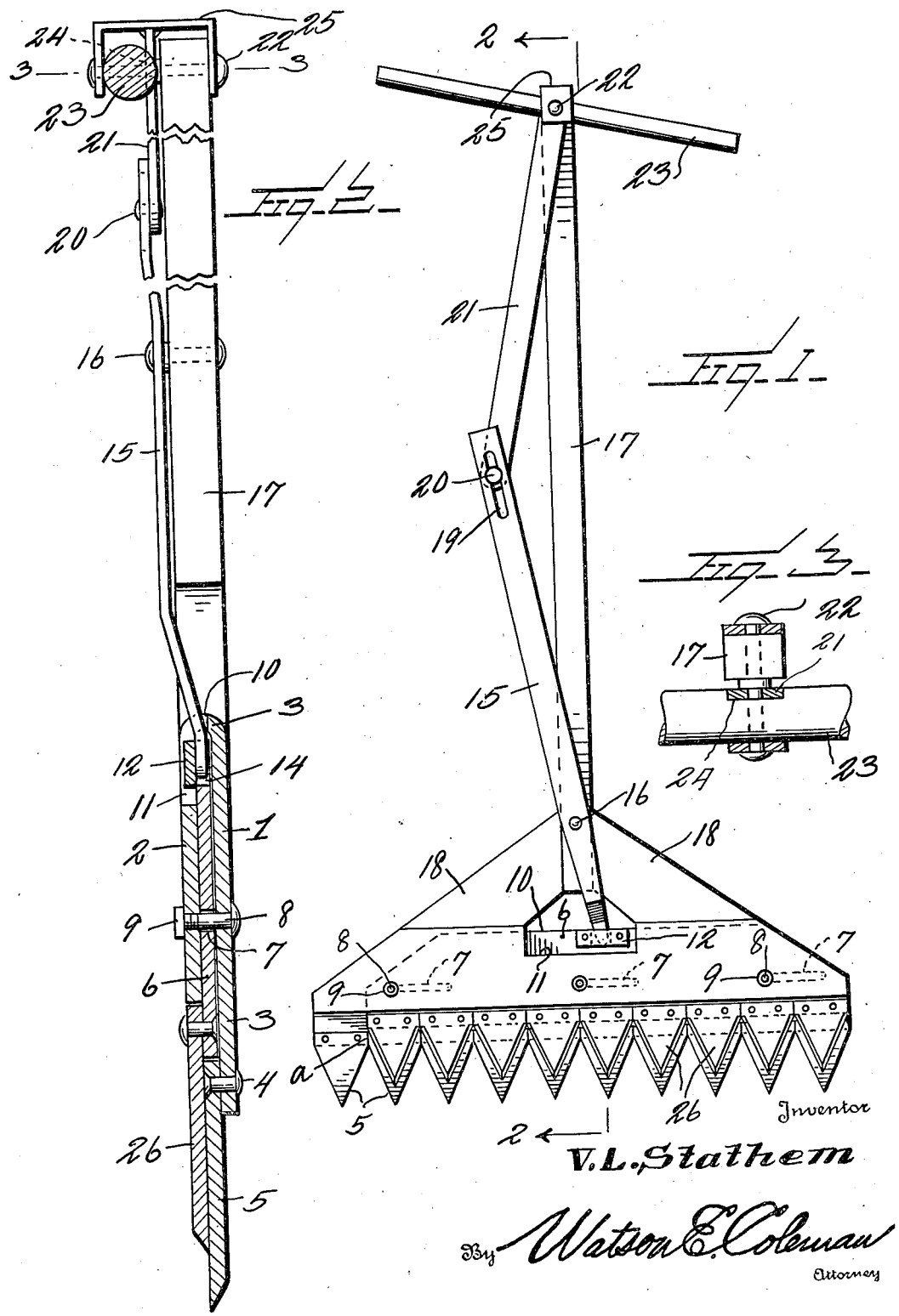

2,124,718

UNITED STATES PATENT OFFICE 2,124,718

CUTTING IMPLEMENT

Vereau L. Stathem, Riverdale, Calif.

Application May 6, 1937, Serial No. 141,152

3 Claims. (Cl. 30—209)

This invention relates to a cutting implement, and it is primarily an object of the invention to provide an implement of this kind especially designed and adapted for use in cutting hay, corn or the like while in stack to facilitate removal of the fodder as required.

The invention consists in the details of construction and in the combination and arrangement of the several parts of my improved cutting implement whereby certain important advantages are attained and the device rendered simpler, less expensive and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawing, wherein:—

Figure 1 is a view in front elevation of a cutting implement constructed in accordance with an embodiment of my invention;

Figure 2 is a sectional view taken substantially on the line 2—2 of Figure 1;

Figure 3 is a detailed sectional view taken substantially on the line 3—3 of Figure 2.

My improved cutting implement as herein disclosed comprises a sheet of material of desired dimensions and which is bent upon itself to provide two overlying plates 1 and 2 with the connecting bend 3 being along the rear marginal portions of said plates. The forward marginal portion of the plate 2 terminates a predetermined distance inwardly of the plate 1 to provide a ledge along which is riveted, as at 4, or otherwise rigidly attached the stationary cutter blades or teeth 5. These teeth or blades 5 are substantially V-shaped in form with their apices forwardly directed and the inner portions of adjacent blades are in close contact one with the other as indicated at a in Figure 1 whereby is provided effective retaining means for the sliding or reciprocating plate 6 which has its major portion positioned between the plates 1 and 2. However, to maintain said plate 6 in substantially a fixed path of travel said plate is provided at spaced points therealong with the aligned and longitudinally disposed elongated openings or slots 7 through each of which is directed a bolt 8. This bolt 8 is also disposed through the plates 1 and 2 and bridges the space therebetween and is held in position by the holding nut 9.

The central portion of the connecting bend 3 is cut away to provide a slot 10 which is continued, as at 11, inwardly of the outer plate 2. Secured to the outer face of the plate 6 within the continued portion 11 of the slot 10 is a loop strap 12 coacting with the adjacent rear marginal portion of the plate 6 to provide a socket 14 in which is received an end portion of an elongated lever 15. This lever 15 at a point 16 in relatively close proximity to the plate 6 is pivotally connected to a handle member 17 of desired length. The inner end portion of this handle member 17 is secured between the inner ends of two diverging brace arms 18 which have their outer end portions welded or otherwise suitably secured to the return bend 3 at opposite sides of the slot 10. The handle member 17 may be of metal with the arms 18 also welded thereto although, of course, I do not wish to be understood as limiting myself in this respect.

The outer end portion of the lever 15 extends a material distance rearwardly from its pivot 16 and its outer or free end portion is provided therethrough with a longitudinally directed slot 19 of desired length through which is directed a headed member 20 or the like carried by and extending laterally from the inner extremity of a rock arm 21. The outer or opposite extremity of this arm 21 is pivotally connected, as at 22, to the outer end portion of the handle member 17. The pivot member 22 is also directed through the central portion of an operating bar 23 arranged substantially at right angles to the arm 21 and said bar 23 is provided with a recess 24 to receive a portion of the arm 21 so that the bar 23 and arm 21 will be caused to swing in unison. Associated with the upper or outer end of the handle member 17 and the outer extremity of the pivot member 22 is a reinforcing or bracing bracket 25.

The forward marginal portion of the sliding plate 6 has secured thereto in advance of the plate 2 the cutting teeth 26 which coact in a well known manner with the stationary teeth 5. These cutting teeth 26 are also preferably V-shaped in form with their apices outwardly disposed and with adjacent teeth in close contact one with the other.

My improved implement as herein disclosed is particularly designed for cutting out benches in stacked hay, corn or other fodder and the desired cutting action is accomplished by rocking the bar 23 which is grasped by the hands of the operator. This desired rocking of the bar 23 can be accomplished at the same time the desired pressure is being imposed upon the implement to cause it to enter the stack as desired in making either a vertical or horizontal cut or cutting along any other line as may be required.

From the foregoing description it is thought to be obvious that a cutting implement constructed in accordance with my invention is particularly well adapted for use by reason of the convenience and facility with which it may be assembled and operated, and it will also be obvious that my invention is susceptible of some change and modification without departing from the principles and spirit thereof and for this reason I do not wish to be understood as limiting myself to the precise arrangement and formation of the several parts herein shown in carrying out my invention in practice except as hereinafter claimed.

I claim:—

1. A cutting implement comprising a head of sheet metal folded to provide overlying spaced plates, the rear marginal portions of the plates being connected, one of said plates having its forward longitudinal margin terminating in advance of the corresponding margin of the second plate, cutting teeth secured to the extended portion of the one plate, a sliding plate positioned between the two plates inwardly of said teeth, cutting teeth carried by the forward marginal portion of the sliding plate for coaction with the stationary teeth, a handle member, means for attaching the same to the rear portion of the head, a rock lever mounted upon the handle member and operatively connected with the sliding plate, and means carried by the outer portion of the handle member and operatively engaged with the lever for rocking said lever to reciprocate the plate.

2. A cutting implement comprising a head of sheet metal folded to provide overlying spaced plates, the rear marginal portions of the plates being connected, one of said plates having its forward longitudinal margin terminating in advance of the corresponding margin of the second plate, cutting teeth secured to the extended portion of the one plate, a sliding plate positioned between the two plates inwardly of said teeth, cutting teeth carried by the forward marginal portion of the sliding plate for coaction with the stationary teeth, a handle member, means for attaching the same to the rear portion of the head, the rear portion of one of the plates being provided with a slot, a socket member carried by the sliding plate within said slot, a rock lever mounted upon the handle member and having one end portion engaging within the socket member, a rock arm secured to the outer portion of the handle member and operatively connected with the lever, and means for rocking said arm.

3. A cutting implement comprising a head of sheet metal folded to provide overlying spaced plates, the rear marginal portions of the plates being connected, one of said plates having its forward longitudinal margin terminating in advance of the corresponding margin of the second plate, cutting teeth secured to the extended portion of the one plate, a sliding plate positioned between the two plates inwardly of said teeth, cutting teeth carried by the forward marginal portion of the sliding plate for coaction with the stationary teeth, a handle member, means for attaching the same to the rear portion of the head, the rear portion of one of the plates being provided with a slot, a socket member carried by the sliding plate within said slot, a rock lever mounted upon the handle member and having one end portion engaging within the socket member, a rock arm secured to the outer portion of the handle member and operatively connected with the lever, and a hand bar operatively engaged with the rock arm for rocking the same.

VEREAU L. STATHEM.